United States Patent [19]

Gourdenne et al.

[11] Patent Number: 4,468,485

[45] Date of Patent: Aug. 28, 1984

[54] METHOD OF PREPARING POLYMER LATTICES OF HOMOGENEOUS INTERPENETRATED STRUCTURE

[75] Inventors: Albert Gourdenne, Ramonville St. Agne; Pascal Heintz, Troyes, both of France

[73] Assignee: Electricite de France (Service National), Paris, France

[21] Appl. No.: 457,133

[22] Filed: Jan. 11, 1983

[30] Foreign Application Priority Data

Jun. 28, 1982 [FR] France .................................. 82 11279

[51] Int. Cl.³ .......................... C08J 3/24; C08L 63/00; C08L 63/06
[52] U.S. Cl. .................................... 523/137; 427/45.1; 524/300; 524/400; 525/10; 525/31
[58] Field of Search ....................... 523/137, 300, 400; 525/10, 31; 427/45.1

[56] References Cited

U.S. PATENT DOCUMENTS

| | | | |
|---|---|---|---|
| 3,463,749 | 8/1969 | Taft ........................................ | 525/31 |
| 3,882,187 | 5/1975 | Takiyama et al. ...................... | 525/31 |
| 3,926,889 | 12/1975 | Duchesneau et al. ............... | 523/300 |
| 4,011,197 | 3/1977 | Lee ...................................... | 523/137 |
| 4,129,488 | 12/1978 | McGinniss ............................ | 525/31 |
| 4,243,744 | 1/1981 | Lockwood et al. ................ | 427/45.1 |
| 4,302,553 | 11/1981 | Frisch et al. ............................ | 525/31 |
| 4,360,607 | 11/1982 | Thorsrud et al. .................... | 523/137 |

FOREIGN PATENT DOCUMENTS 52-18799 12/1977 Japan ...................................... 525/31

Primary Examiner—Ronald W. Griffin
Attorney, Agent, or Firm—Ladas & Parry

[57] ABSTRACT

A method of preparing polymer lattices of homogeneous interpenetrated structure, starting from a mixture of at least two basic prepolymer constituents is characterized by the fact that a microwave radiation is applied having a frequency spectrum chosen in order that it interacts preferentially with the first prepolymer and a power density chosen in order that it directly activates the exothermic reaction of cross-linking of the first prepolymer. The cross-linking of the second prepolymer is only triggered under the combined action of the heat due to the interaction of the microwave energy with the second prepolymer and the heat introduced by the cross-linking reaction of the first prepolymer, which makes it possible to combine propagation of the two cross-linking reactions at similar speeds.

11 Claims, 6 Drawing Figures

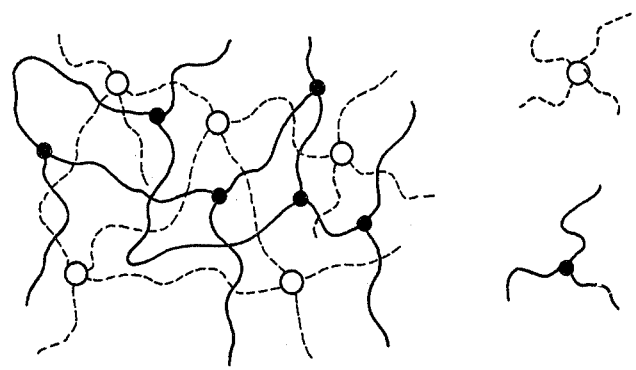
FIG_1
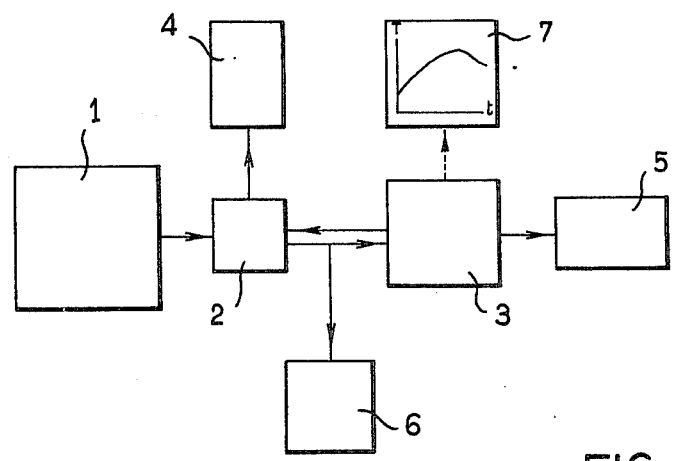
FIG_2

METHOD OF PREPARING POLYMER LATTICES OF HOMOGENEOUS INTERPENETRATED STRUCTURE

The present invention relates to a process for preparing polymer lattices of homogenous interpenetrated structure, from a mixture of at least two basic prepolymer constituents.

The manufacture of interpenetrated polymer lattices is usually carried out by the conventional terminal method. This method of activating cross linking reactions of two polymers is tricky because in order for it to be implemented in a satisfactory manner it involves reaction kinetics which are similar. In fact, the final structure must be as homogeneous as possible and especially it must not include islands or zones which are richer in one particular polymer, i.e. it is necessary to avoid the phenomenon of phase separation. Such a result is difficult to achieve in practice, for the cross-linking mechanisms of the two resins of the basic mixture are of a different type in the large majority of cases, in such a manner as to avoid covalent chemical bridgings between the two lattices. Furthermore, it is practically impossible in practice to make polymerisation kinetics of the basic prepolymer constituents coincide.

The systhesis of interpenetrated lattices is usually achieved by means of a thermal activation of the various cross-linking reactions, carried out in an oven or autoclave, and it is extremely rare to obtain homogeneous final stuctures owing to the difficulties encountered in making the cross-linking speeds coincide. Usually structures with phase separation are obtained. This major drawback has, moreover, considerably limited the development of interpenetrated polymer materials.

According to the method of the present invention, a microwave radiation is applied to the basic pre-polymer mixture: this microwave radiation is of a frequency spectrum chosen in order that it may interact preferentially with the first prepolymer and of a power intensity chosen in order that it may directly activate the exothermic cross-linking reaction of the first pre-polymer, whilst only triggering the cross-linking of the second prepolymer under the combined action of the heat due to the interaction of the microwave energy with the second prepolymer and the heat introduced by the cross-linking reaction of the first prepolymer, which make the combined prepagation of the two cross-linking reactions possible at similar speeds.

According to another characteristic of the present invention, the two basic prepolymer constituents are cross-linked according to different polymerisation mechanisms. In particular, one of the basic prepolymers can be cross-linked according to a polymerisation mechanism which gives rise to free radicals, whilst the other basic prepolymer can be cross-linked according to a polymerisation mechanism by polycondensation.

The prepolymer which becomes cross-linked according to a polymerisation mechanism which gives rise to free radicals can, for example, be formed with advantage by an unsaturated polyester resin, especially by a solution of 70% by weight unsaturated polyester resin in a solvent such as styrene.

The prepolymer of the basic mixture which is cross-linked according to a polymerisation mechanism by polycondensation can, for example, be formed to advantage by an epoxy resin, in particular of the type DGEBA with the addition of a hardener such as diaminodiphenylmethane.

Such a mixture of two basic prepolymer constituents can, for example be formed by approximately 20% by weight of a solution of unsaturated polyester resin and approximately 80% by weight of an epoxide resin with a hardener added.

According to one variant of the process of the present invention, the two basic prepolymer constituents can also be cross-linked according to identical polymerisation mechanisms in particular by polycondensation.

According to an additional characteristic of the method of preparation of the present invention, the mixture of at least two basic prepolymer constitutents can, moreover, contain other additives, such as a reinforcing charge, in particular a mineral charge such as glass fibre.

The method which forms the object of the present invention can be implemented by using either a microwave treatment in a single mode cavity or in multimode cavity. The frequency spectrum of the microwave radiation used, can, for example include frequencies between about 0.5 and about 100 GHz inclusive, preferably between about 1 and approximately 5 GHz inclusive, and in particular, a frequency of the order of 2.5 GHz.

The present invention relates also to polymer lattices of a homogeneous interpenetrated structure obtained by implementing the method previously described.

The invention will be further described by way of example only with reference to the accompanying drawings, in which:

FIG. 1 shows diagrammatically an interpenetrated structure of homogeneous nature of an epoxy lattice and of a polyester lattice.

FIG. 2 shows the main diagram of a microwave device which makes it possible to implement the method of the present invention.

Figure 3:
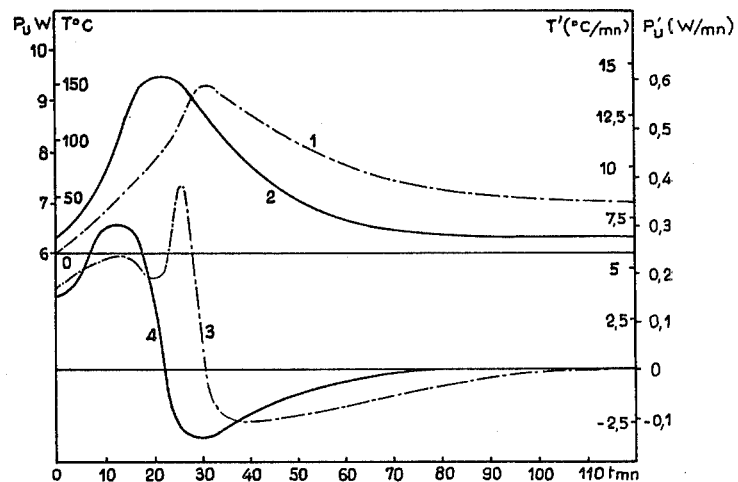
FIG. 3 shows the curves of the variations of a certain number of experimental parameters as a function of time during a polymerisation of a given mixture at a given power.

In the diagram of the device illustrated in FIG. 2 a microwave generator 1 delivers an electromagnetic beam polarised electrically with a frequency of 2.45 GHz and with a power Po between 0 and 1 Kw inclusive which is propogated within a wave guide according to the method of $TE_{01}$ including a circulator 2. The beam then reaches the reactor 3 which consists of a cylindrical pyrex receptacle with good transparency to mixcrowaves, the reactor being filled with the mixture of the basic prepolymer coristituents.

Hence the initial beam can be divided into three parts:
one part which is reflected by the reactor in the inlet wave guide and deviated through its circulator 2 or an equivalent ferrite system, towards a charge 4 which absorbs the radiations;

one part is absorbed by the specimen taking into account the dielectric losses in the case of microwaves of 2.45 GHz, the polarisable entities are the dipoles;

one part is transmitted and absorbed by the second charge 5.

The use of two charges avoids stationary wave systems within the wave guide and it can be said that the waves are propagated in a progressive manner.

The device as a whole consists, moreover, of measuring and regulating systems that is, in particular a watt meter 6, which measures the variations of electric power associated with the different beams, reflected and transmitted as well as the dielectric losses when the microwaves pass through the specimen.

The temperature variations T of the specimen treated by the microwaves are measured by means of an immersed thermistor inside a pyrex tube filled with silicone oil, which is transparent to electromagnetic radiations and which is itself partially immersed in the basic misture which is to be cross-linked. The variations of these different magnitudes as a function of time are stored in a recording unit which is shown diagrammatically under the reference number 7.

By way of illustration some examples of preparation of polymer lattices of homogeneous interpenetrated structure in accordance with the object of the present invention will be shown below.

The basic prepolymer mixture examined below consists of the following:

1

Unsaturated polyester 70% by weight
styrene 30% by weight
without initiator.

2

Epoxide resin of type D.G.E.B.A.
diamino diphenylinethane (hardener)

The above mixture leads to a rigid interpenetrated polymer structure, that is to say, vitreous, the two basic lattices being themselves rigid.

It is however, perfectly possible, within the framework of the present invention, to start with other basic prepolymer mixtures leading individually to soft lattices, that is, elastic, or rigid. It is thus possible to associate between them two soft prepolymers or against a soft prepolymer with a rigid prepolymer.

It is observed that the nature of the cross-linking mechanisms is not fundamentally modified by the action of the microwave. For example, in the case of the above mixture, the cross-linking mechanism of the unsaturated polyester resin in the presence of styrene is that of a polymerisation reaction, giving rise to free radicals and the mechanism of the cross-linking reaction of the epoxide resin in the presence of a hardener is that of a polycondensation reaction.

On the other hand, the method of the present invention introduces determinitive advantages in relation to the method of activation by means of the conventional thermal method in the furnace or autoclave; the following are observed in particular:

a flexibility in the choice of the electric power of the microwave radiation which makes it possible to bring the cross-linking kinetics of the two prepolymers together and to avoid the drawback of phase separation;

the possibility of stopping the microwave heating instantly in the case of the reactions running away;

a more homogeneous structuring of the finished materials which in particular are baked right through, unlike cross-linking by thermal methods often observed owing to the penetration of the polymerisable medium by the electromagnetic waves.

The particular examples mentioned below have been achieved by implementation of a microwave treatment of a wave guide according to the method $TE_{01}$ with a frequency of 2.45 GHz.

EXAMPLE 1

POLYMERISATION OF A GIVEN MIXTURE AT A GIVEN POWER

A weight of 20 g of the basic mixture defined above was placed in a pyrex pill box. The experimental parameters are as follows:

Po: power of electromagnetic radiations delivered by the generator (unit: watt) (Po=50 W)

Pu: power dissipated in the specimen by dielectric losses (unit: watt)

T: average temperature of the specimen (unit ° C.).

$$T' = dT/dt$$

t: time

T': derivative of the temperature in relation to time 'unit: ° C./min;)

Pu'=dPu/dt Pu': derivative of the power in relation to time (unit watt/min)

The experimental results are given in the form of the curves shown in FIG. 3. The four curves shown correspond to the following variations:

1. T=T (t)
2. Pu=Pu (t)
3. T'=T' (t)
4. Pu'=Pu' (t)

In particular it is observed here that the temperature increases from 0° C., after having temporarily reached a value close to 50° C. corresponding to the fluxing transition of the mixture. When the temperature is sufficient, the cross-linking becomes intense, the temperature increases and reaches a maximum (T: 147° C.) corresponding to an almost complete cross-linking. The decrease observed beyond the maximum corresponds to the cooling of the cross-linked substance.

The power Pu increases progressively when the mixture becomes fluid and soon passes through a maximum before the exothermy develops. The maximum corresponds to the gelatin of the reaction medium. The decrease which is subsequently observed corresponds to the intensification of the bridging reactions. When the material is completely cross-linked, Pu levels off.

The derived curves (3) and (4) make it possible to define the particular points of integral curves T and Pu better.

The initially pasty (or fluid) mixture is transformed into a transparent slid, which is vitreous and of yellow/orange colour.

EXAMPLE 2

| POLYMERISATION OF A MIXTURE OF VARIABLE COMPOSITION AND GIVEN POWER (Po = 50 W) | | | | | | | | |
|---|---|---|---|---|---|---|---|---|
| No. of tests | 1 | 2 | 3 | 4 | 5 | 6 | 7 | 8 |
| % epoxy | 100 | 95 | 90 | 80 | 60 | 40 | 20 | 0 |
| % polyester | 0 | 05 | 10 | 20 | 40 | 60 | 80 | 100 |

Figure 4:
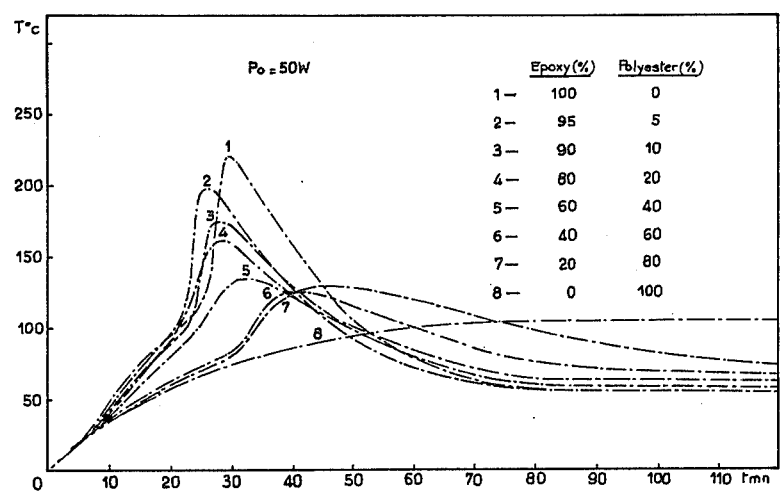
FIG. 4 shows the temperature variation curves (in degrees centigrade), as a funcation of time, obtained for mixtures of variable composition and given power.

The experimental results are given in the attached FIG. 4.

In particular it is observed that the curves T=T (t) of FIG. 4 have the same appearance with exception of that of the polyester (curve 8). When it is a question of mixtures the exothermy is triggered increasingly later: the maximum is displaced towards the highest values of time when the polyester percentage is increased; the latter, moreover, does not polymerise at the power Po used.

The other compositions (curves 1,2,3,4,5,6,7) regularly give rigid polymerised materials. It would be expected that the pure epoxide resin (test No. 1) would lead to the most rapid exothermy. But it is nothing of the sort. This tendency is associated with a physical state of the mixtures which are more mobile—and which therefore dissipate energy better—than the epoxide resin.

EXAMPLE 3

Figure 5:
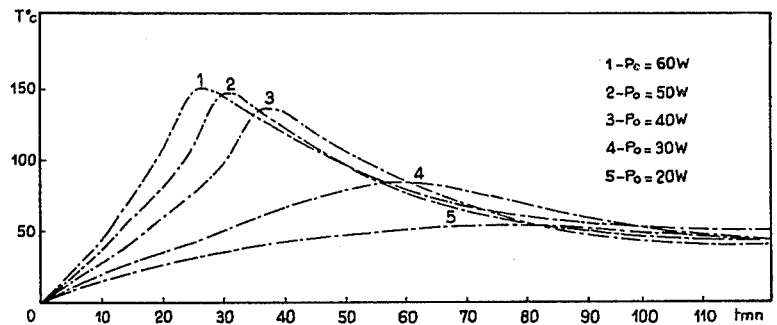
FIG. 5 shows the temperature variation curves (in degrees centigrade) as a function of time, obtained on polymerisation of a mixture of given composition and variable power.

| POLYMERISATION OF A MIXTURE OF GIVEN COMPOSITION AND VARIABLE POWER (FIG. 5). | |
|---|---|
| Mixture: | epoxide 80% - Polyester 20% |
| Powers Po: | (1) 60 W - (2) 50 W - (3) 40 W (4) 30 W - (5) 20 W. |

Without excluding the eventuality of a specific microwave effect on the various reactions, the various curves are arranged in relation to one another in accordance with the hypothesis of a conversion of Pu into heat, that is, their exothermy is displaced towards the high values of time when there is less heating (Po is reduced).

It is useful in particular to note that Test No. 1 (Po=60 W) leads to an opaque final structure, i.e. it displays the phenomenon of phase separation due to too great a divergence between the two kinetics of cross-linking of the basic prepolymers. A reduction of the power Po was sufficient to cause this phenomenon to disappear and to lead to homogeneous materials.

The cloudiness in fact disappears for Po$\leq$40 W.

EXAMPLE 4

Figure 6:
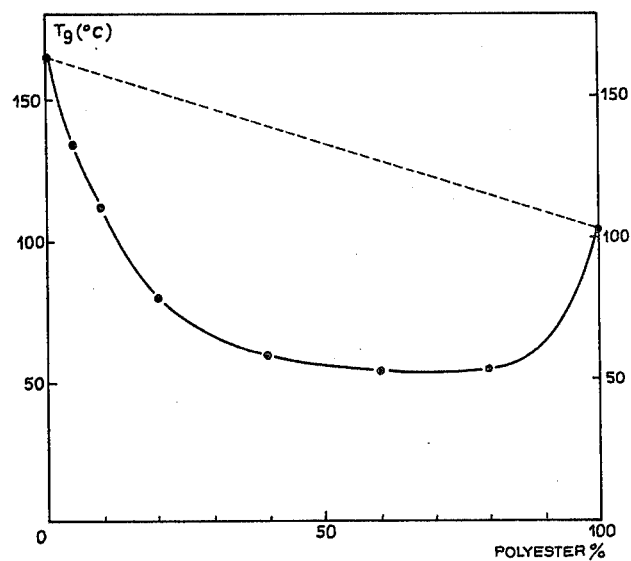
FIG. 6 shows the curve of variation of the vetreous trans temperature of interpenetrated lattices as a function of the rate of polyester.

VITREOUS TRANSITION TEMPERATURES Tg OF THE INTERPENETRATED NETWORKS (FIG. 6).

The interpenetrated polymer networks are amorphous and rigid at ordinary temperatures (or are in their vitreous state). They may be characterised by their vitreous transition temperature Tg. FIG. 6 shows the expected development of Tg as a function of the polyester rate, this variation being characteristic of the interpenetrated lattices, for specimens prepared at 50 W.

Note: The specimen at 100% polyester was prepared at Po=140 W.

Of course the present invention does not need to be limited to the particular implementation examples described, but it is perfectly possible to imagine a certain number of variations of execution. In particular it is possible to implement the method of the invention starting from basic mixtures containing more than two prepolymers, containing other monomers or again from basic mixtures in which one and/or the other prepolymer is replaced by a monomer. Moreover, the wave guide used can be replaced by multi-mode cavities, tunnel furnaces or similar.

What is claimed is:

1. In a method of preparing polymer lattices of interpenetrated structure starting from a mixture of at least two basic prepolymer constituents the improvement which resides in producing a homogeneous interpenetrated structure by applying microwave radiation to said mixture, the components of which are cross-linked by different polymerization mechanisms, the microwave radiation having a frequency spectrum chosen in order that it preferentially interacts with the first prepolymer and of a power intensity selected in order that it directly activates the exothermic cross-linking reaction of the first prepolymer, whilst only triggering the cross-linking of the second prepolymer under the combined action of the heat due to the interaction of the microwave energy with the second prepolymer and the heat introduced by the cross-linking reaction on the first prepolymer which makes possible the combined propagation of the two cross-linking reactions at similar speeds.

2. Method according to claim 1, wherein one of the basic prepolymer constituents is cross-linked according to a free radical polymerisation mechanism and the other basic prepolymer constituent is cross-linked according to a polymerisation mechanism by polycondensation.

3. Method according to claim 2, wherein one of the basic prepolymer constituents is an unsaturated polyester resin and the other basic prepolymer constituent is an epoxide resin.

4. Method according to claim 3, wherein the mixture of the two prepolymer constituents comprises of a mixture of about 20% by weight of a solution of an unsaturated polyester resin in a styrene and of about 80% by weight of epoxide resin with a hardener added.

5. Method according to claim 1, wherein the two basic prepolymer constituents are cross-linked according to polymerisation mechanisms by polycondensation.

6. Method according to claim 1, wherein the mixture of at least two basic prepolymer constituents contains moreover other additives such as a reinforcing charge, in particular a mineral charge such as a charge of glass fibres.

7. Method according to claim 1, wherein a microwave treatment in a monomode cavity is used.

8. Method according to claim 1, wherein a microwave treatment in multimode cavity is used.

9. Method according to claim 1 wherein the frequency spectrum used comprises frequencies between about 0.5 and about 100 GHz inclusive.

10. Method according to claim 9 wherein the frequency spectrum used comprises frequencies between about 1 and approximately 5 GHz.

11. Method according to claim 10 wherein the frequency is of the order of 2.5 GHz.

* * * * *